United States Patent [19]

Crawford

[11] Patent Number: 4,561,053
[45] Date of Patent: Dec. 24, 1985

[54] INPUT/OUTPUT MULTIPLEXER FOR A DATA PROCESSING SYSTEM

[75] Inventor: Knute S. Crawford, Phoenix, Ariz.

[73] Assignee: Honeywell Information Systems, Inc., Phoenix, Ariz.

[21] Appl. No.: 560,659

[22] Filed: Dec. 12, 1983

Related U.S. Application Data

[63] Continuation of Ser. No. 222,460, Jan. 5, 1981, abandoned.

[51] Int. Cl.[4] .............................................. G06F 3/00
[52] U.S. Cl. .................................................. 364/200
[58] Field of Search ........................ 364/200 MS File

[56] References Cited

U.S. PATENT DOCUMENTS

| | | | |
|---|---|---|---|
| 3,200,380 | 8/1965 | MacDonald | 364/200 |
| 3,369,221 | 2/1968 | Lethin | 364/200 |
| 3,408,632 | 10/1968 | Hauck | 364/200 |
| 3,676,846 | 7/1972 | Busch | 364/200 |
| 3,681,755 | 8/1972 | Stone | 364/200 |
| 4,390,943 | 6/1983 | Twibell et al. | 364/200 |

Primary Examiner—Raulfe B. Zache
Attorney, Agent, or Firm—A. A. Sapelli; J. S. Solakian; L. J. Marhoefer

[57] ABSTRACT

In an input/output multiplexer of a data processing unit, a plurality of components, capable of independent activity, provide for the simultaneous execution of a multiplicity of operations involving the exchange of signal groups between a central subsystem and peripheral subsystems. The input/output multiplexer includes apparatus for controlling the receipt from delivery to the central subsystem and peripheral subsystems of signal groups. Apparatus is provided to execute address development normally performed in the central subsystem. Apparatus is also provided to analyze control subsystem signal groups and generate pre-selected command signal groups for delivery to the central subsystem or to the peripheral subsystems. Apparatus in the input/output multiplexer also provides a status of each operation currently in execution.

4 Claims, 8 Drawing Figures

INPUT/OUTPUT MULTIPLEXER FOR A DATA PROCESSING SYSTEM

This is a continuation, of application Ser. No. 222,460 filed Jan. 5, 1981 now abandoned.

BACKGROUND OF THE INVENTION

1. Field of the Invention

This invention relates generally to data processing systems and more particularly to apparatus coupling the central subsystem with peripheral subsystems. The coupling apparatus provides the means for transferring signal groups between the central subsystem and the peripheral subsystems.

2. Description of the Prior Art

It is known in the prior art to provide input/output apparatus coupling a central subsystem and peripheral subsystems that in response to the initiation of a predetermined operation involving the transfer of signals between the two subsystems, preempts further use of the input/output apparatus until completion of the predetermined operation. Because an operation can typically involve the exchange of a multiplicity of signal groups, and can typically involve a peripheral device with significantly slower operating characteristics as compared to the central subsystem, the performance of the entire data processing system can be impacted.

In order to maintain an efficient flow of information between the two subsystems, various techniques have been devised to improve the system's performance. For example, priority assignments can be instituted in the central subsystem so that operation essential for the efficient operation of the central processing unit of the central subsystem are performed prior to the less essential operations. Similarly, look-ahead techniques can be implemented so that operations can be performed, such as data signal group transfers, prior to the requirement by the central subsystem, thereby permitting a nonessential operation to be performed during a period of relative inactivity.

While these techniques and others have been implemented, the ever-increasing speed of the central processing unit has lead to a requirement of increasing efficiency of operations involving the central subsystem and peripheral subsystems.

It is therefore an object of the present invention to provide an improved data processing system.

It is another object of the present invention to provide improved apparatus coupling the central subsystem and the peripheral subsystem of a data processing system.

It is yet another object of the present invention to provide improved performance in execution by central subsystem instructions involving the peripheral subsystems.

It is a more particular object of the present invention to provide apparatus for coupling the central and peripheral subsystems that permits concurrent execution of a multiplicity of operations.

It is yet another particular object of the present invention to provide apparatus coupling a central subsystem with peripheral subsystems in which a plurality of signal group manipulations can be performed independently.

It is still another particular object of the present invention to provide apparatus coupling the central subsystem and the peripheral subsystems permitting independent execution of portions of a multiplicity of concurrent operations.

SUMMARY OF THE INVENTION

The aforementioned and other objects of the present invention are accomplished according to the present invention by an input/output multiplexer having a multiplicity of elements capable of independent operation. The input/output multiplexer includes a central subsystem data distributor for controlling the distribution of data groups from the central subsystem, a control word processor for storing required information and preparing real addresses, a channel service processor for controlling transfer of data from the peripheral subsystems to the central subsystem, and a read register and fault interrupt processor for performing service functions in the input/output multiplexer required by the central subsystem. In addition, other elements of the input/output multiplexer provides an interface with the peripheral subsystems and with an interface entering data in the central subsystem.

The operation for the transfer of data signals between the central subsystem and the peripheral subsystem are divided into a plurality of commands. The participation of each component of the input/output multiplexer for execution of the operation commands is independent of the input/output multiplexer components not required for command execution. Thus, commands from various stages of a plurality of operations may be in concurrent execution in the input/output multiplexer. Priorities are included for the components in the input/output multiplexer to ensure that essential information is provided to the central subsystem.

These and other features of the invention will be understood upon the reading of the following description in conjunction with the drawings.

DESCRIPTION OF THE PREFERRED EMBODIMENTS

Detailed Description of the Figures

Figure 1:
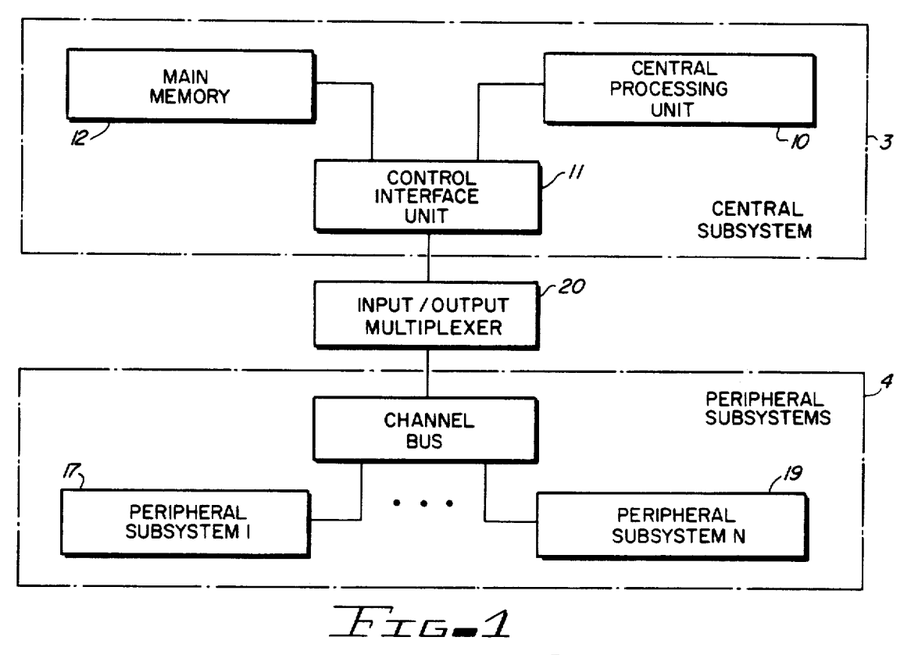
FIG. 1 is a schematic block diagram of a typical data processing system.

Referring now to FIG. 1, the components of a typical data processing system are shown. The central subsystem 3 includes a central processing unit 10, in which signal manipulation is typically performed, a main memory 12 in which the signals required by the central processing unit are stored, and a control interface unit 11 for controlling the transfer of signals to the central processing unit and for controlling the exchange of signals between the central subsystem and the remainder of the data processing system.

The peripheral subsystems 4 are comprised of at least one peripheral subsystem and a channel bus for providing control apparatus for the peripheral subsystem(s). From the perspective of the central subsystem, a particular peripheral subsystem is identified by its location on a channel bus. This identification is generally referred to as a peripheral subsystem number. In addition, provision can be made to expand the number of peripheral subsystems by coupling more channel buses in parallel with the original channel bus. In that case, a particular peripheral subsystem can be identified by a channel bus number and a peripheral subsystem number. Insofar as the input/output multiplexer is concerned, the combined channel bus and peripheral subsystem numbers are utilized as address identifications and each number is associated with a location in the memory units associated with each location.

The input/output multiplexer 20 couples the peripheral subsystems and the central subsystem. In addition, to coupling to a plurality of channel buses, the input/output multiplexer can be adapted to couple to a plurality of central subsystems; (i.e., through the use of a plurality of control interface units).

Figure 2:
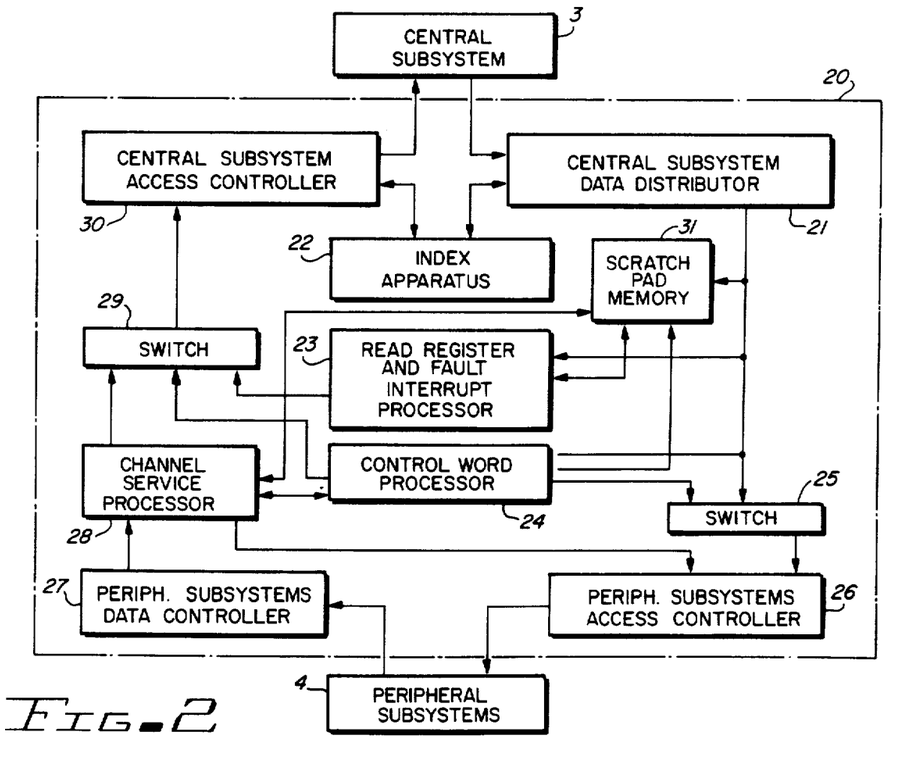
FIG. 2 is a schematic block diagram of an input/output multiplexer according to the present invention.
Figure 3A:
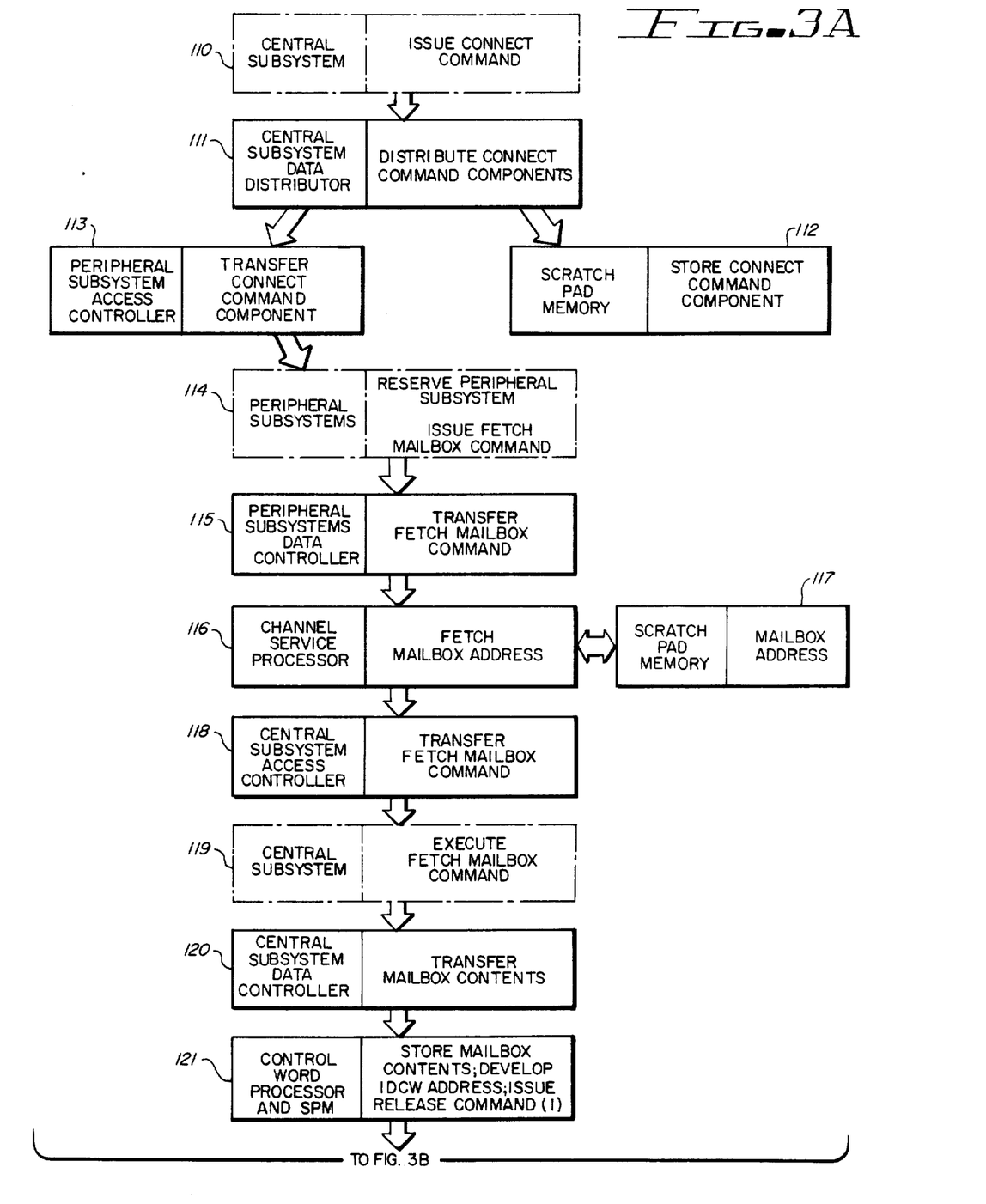
FIGS. 3A, 3B, 3C, 3D and 3E are a flow diagram of the operation for transferring data from a predetermined peripheral subsystem to the central subsystem.
Figure 3B:
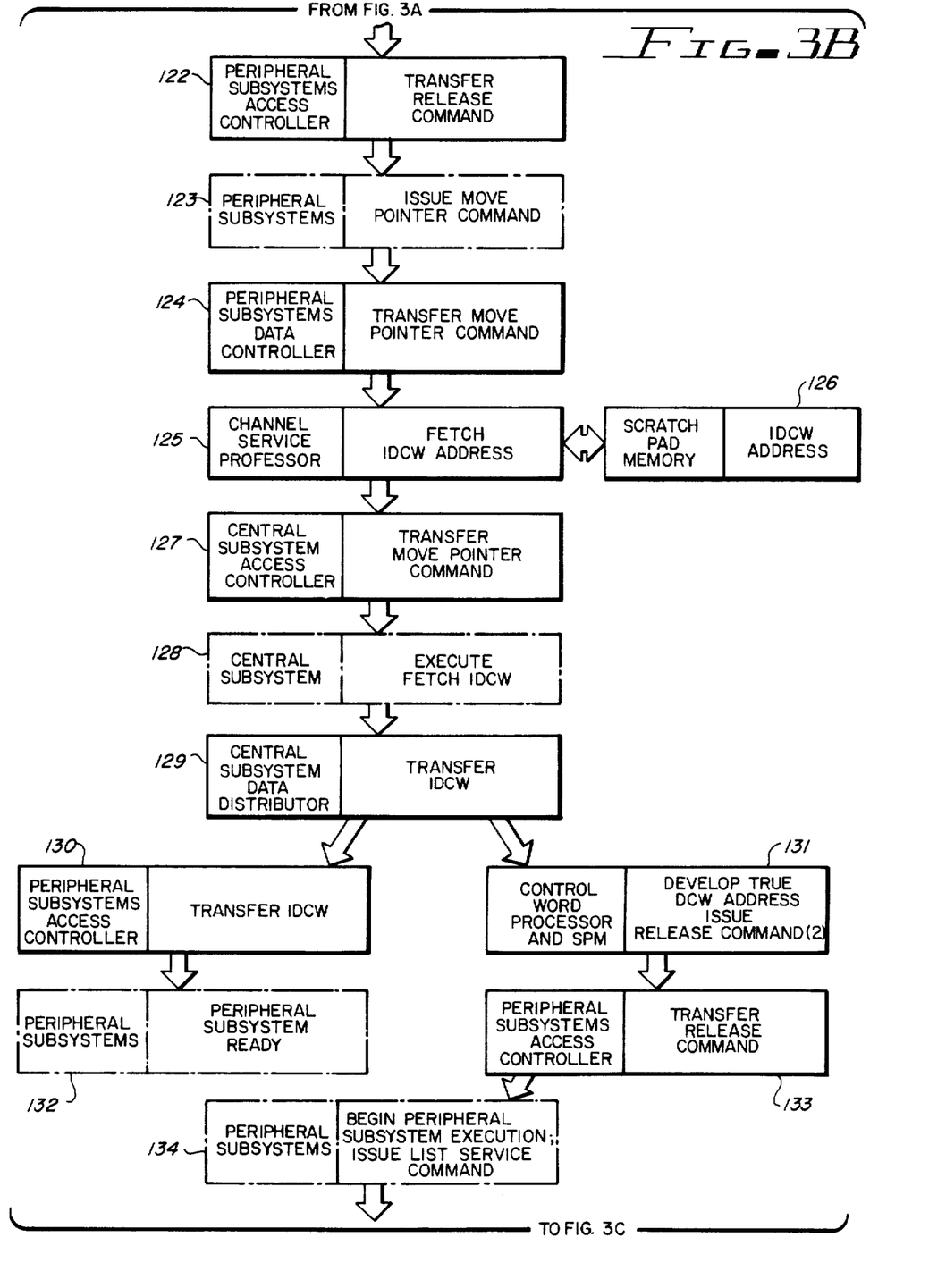
Figure 3C:
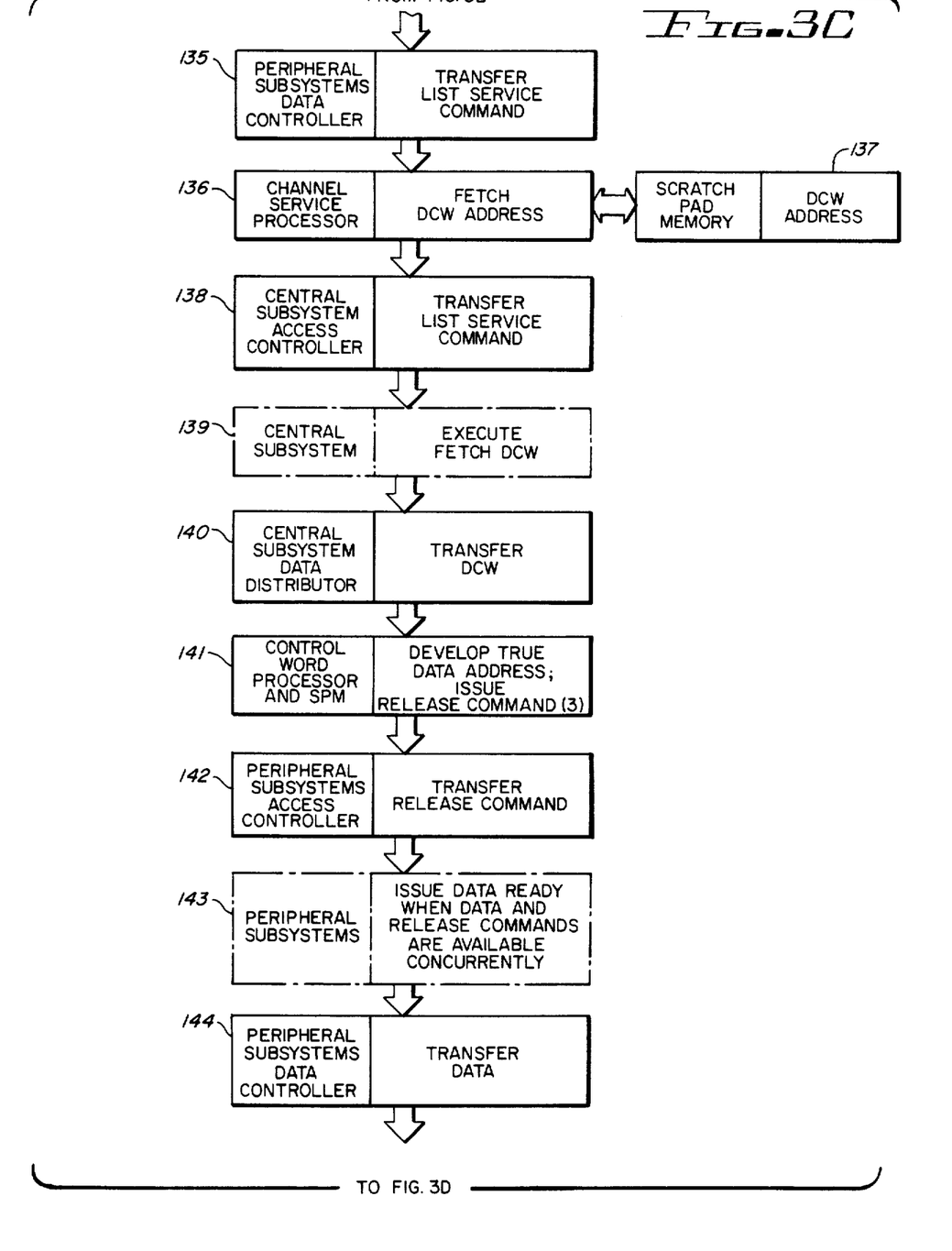
Figure 3D:
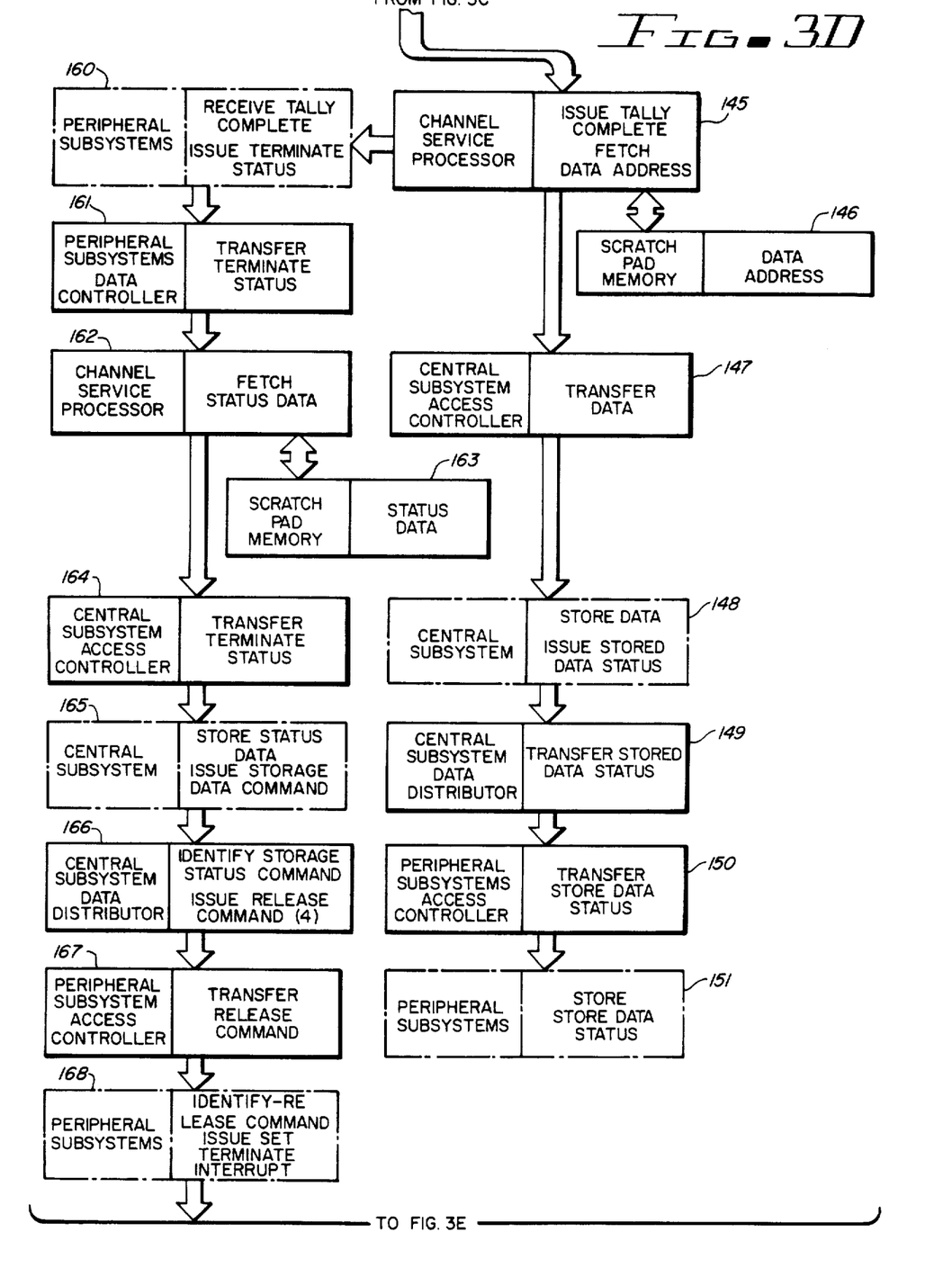
Figure 3E:
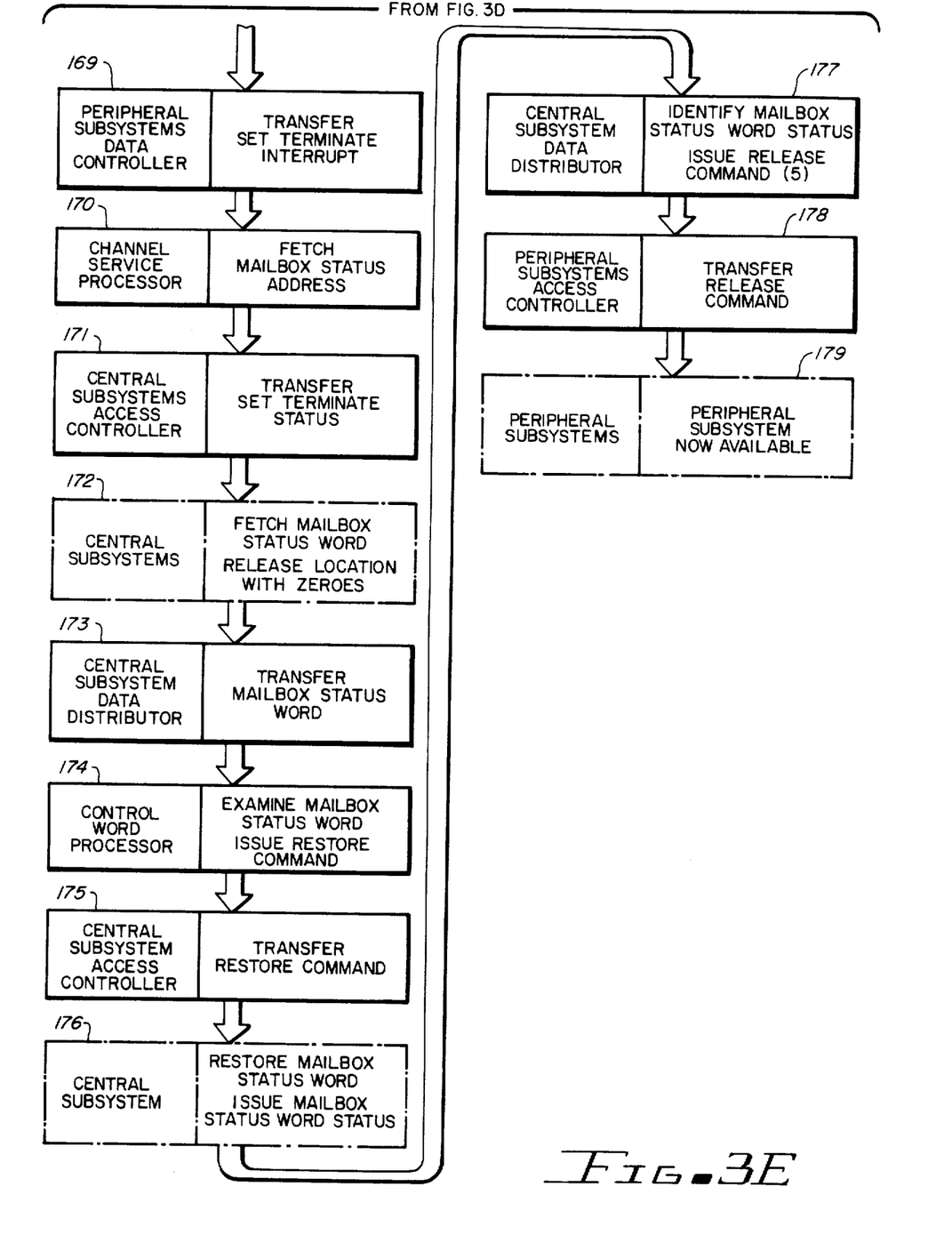

Referring next to FIG. 2, the components of the input/output multiplexer 20 are shown. The central subsystem data distributor 21 is coupled to the central subsystem 3 and is the mechanism for the receipt of signals from the central subsystem. The central subsystem data distributor 21 is coupled to index apparatus 22, read register and fault interrupt processor 23, control word processor 24, switch 25, and scratch pad memory 31. Switch 25 is coupled to the peripheral subsystem access controller 26, read register and fault interrupt processor 23, and control word processor 24. The peripheral subsystem access controller 26 applies signals to the peripheral subsystem 4. The peripheral subsystems 4 applies signals to the peripheral subsystem data controller 27. The channel service processor 28 is coupled to peripheral subsystem data controller 27, control word processor 24 and switch 29. Switch 29 is coupled to control word processor 24, read register and fault interrupt processor 23 and central subsystem access controller 30. The central subsystem access controller 30 is coupled to index apparatus 22 and applies signals to control subsystem 3. The scratch pad memory 31 is coupled to read register and fault interrupt processor 23, control word processor 24 and channel service processor 28.

Referring next to FIG. 3, an example of the implementation of an operation transferring data from a predetermined peripheral subsystem is illustrated. This implementation is composed of a multiplicity of activities and commands involving the various components of the input/output multiplexer. Those activities performed by the components of the input/output multiplexer are indicated in solid boxes, where the activities performed by the peripheral subsystems or the central subsystem is indicated with the broken-line boxes. In response to the requirement for signal groups currently in the predetermined peripheral subsystem by the central subsystem, the central subsystem files are prepared and stored in memory locations. Upon completion of the preparation of the files, the central subsystem issues signal groups referred to as a connect command 110. For simplicity, reference will only be made hereafter to the command name or to the signal group identification (i.e., mailbox address). It will be understood that these identifications refer to signal groups of a predetermined format.

The connect command is received by the central subsystem data distributor. A first component of the connect command 112 is stored in the control word processor and a second portion is transferred 113 to the peripheral subsystem access controller 26. The second component of the connect command is transferred 114 to the peripheral subsystem where the predetermined peripheral subsystem is reserved (i.e., made unavailable in response to other connect commands) and a fetch mailbox command is issued. The fetch mailbox command is transferred 115 through the peripheral subsystem data controller to the channel service processor. The mailbox address, part of the stored first component of the connect command, is retrieved 116 from the central word processor, and the combined command is transferred 118 through the central subsystem access controller to the the central subsystem where the fetch mailbox command is executed 119.

Figure 4:
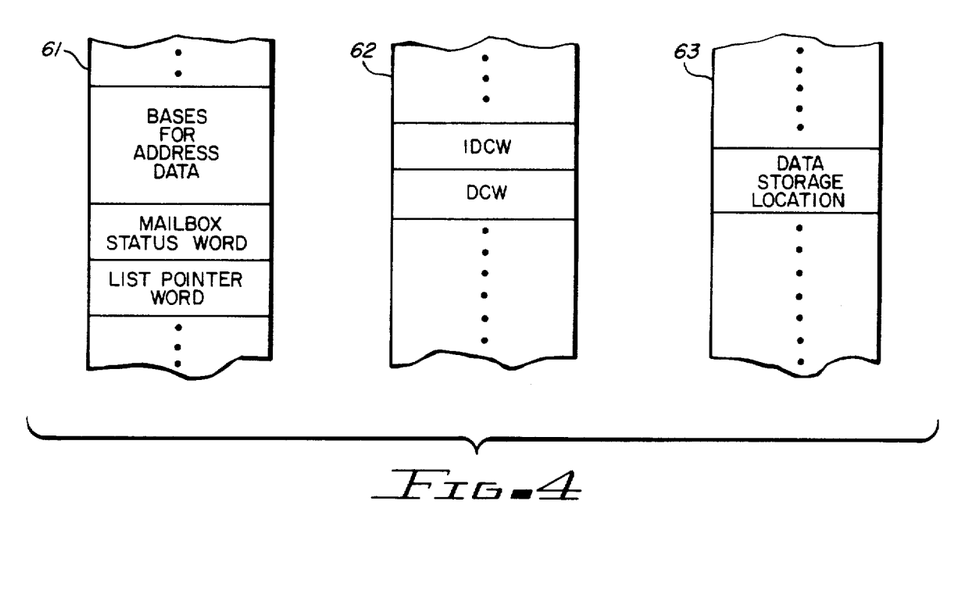
FIG. 4 is a schematic diagram of files stored in the central subsystem that are required for the data transfer operation.

Referring now to FIG. 4, a summary of the various files contained in the central subsystem is shown. File 61 is the mailbox and includes, in consecutive memory locations, bases for obtaining real address signals from the logical address signals utilized by the central subsystem, a mailbox status signal group and list pointer word signal group. The list pointer word signal group, after a predetermined manipulation, provides the address 62 of the instruction data control word signal group (IDCW) and following in a consecutive memory location the data control word signal group (DCW). The data control word after appropriate manipulation, provides the address 63 of the data storage location (i.e., the address into which the first of the peripheral subsystem data word is to be stored).

Referring once again to FIG. 3, the mailbox signal groups is transferred 120 via the central subsystem data distributor to the control word processor where the mailbox signals are stored. The control word processor, utilizing the mailbox contents, develops the real address of the instruction data control word. Upon completion of the address development, a release command (1) is issued 121.

The release command is transferred 122 via the peripheral subsystem access controller to the peripheral subsystems. The peripheral subsystem in response to the release command (1) issues 123 a move pointer command. The move pointer command is transferred 124 through the peripheral subsystem data controller to the channel service processor. In the channel service processor, the real IDCW address is retrieved 125 from the control word processor and a combined signal group is transferred 127 through the central subsystem access controller to the central subsystem.

In response to the data signals the IDCW is retrieved 128 from files in the central subsystem and transferred 129 via the central subsystem data distribution to the control word processor and through 130 the peripheral subsystems access controller to the peripheral subsystems. The receipt of the IDCW signal group by the peripheral subsystems is the last signal group necessary for execution of the data retrieval from the predetermined peripheral subsystem. However, the peripheral subsystem does not execute the retrieval immediately. In the control word processor, the IDCW causes the DCW address to be developed 131 and a release command (2) delivered 133 through the peripheral subsystem access controller to the peripheral subsystem. Upon receipt of the release command(2) indicating the availability of the DCW address the predetermined peripheral subsystem begins to execute 134 the retrieval of the data signal groups required by the central subsystem, and, concurrent with the execution, a list service command is issued.

The list service command is transferred 135 via the peripheral subsystem data controller to the channel service processor. In the channel service processor, the developed DCW address is retrieved 136 from the control word processor, and the list service command is transferred 138 via the central subsystem access controller to the central subsystem. In the central subsystem 139, the DCW address is retrieved 139 from memory in response to the signal groups.

The DCW address is transferred 140 via the central subsystem data distributor to the control word processor. In the control word processor, the true address of the location in the central subsystem into which the data, retrieved from the predetermined peripheral subsystem is to be stored, is developed 141. After development of the address, the control word processor issues release command (3). The release command is transferred via peripheral subsystem access controller 142 to the peripheral subsystem.

When the peripheral subsystems have received the release command and the data is available from the predetermined peripheral subsystem, a data ready signal is issued to the input/output multiplexer. The receipt of the data ready signal causes the signal groups to be transferred 144 through the peripheral subsystems data controller to the channel service processor. The channel service processor retrieves 145 the data address from the control word processor. The data is transferred 147 through the central subsystem access controller to the central subsystem. In the central subsystem, the signal groups are stored 148 in the appropriate address. After storage of the signal groups a stored data status command is transferred 149 via the central subsystem data distributor and transferred 150 through the peripheral subsystem access controller to the peripheral subsystems where the stored data status signal group is stored 151.

Concurrent with the retrieval 145 of the data address, the channel service processor issues a tally complete signal to the peripheral subsystems. The peripheral subsystems develop 160 a terminate status command. The peripheral subsystems data controller transfers 161 the terminate status command to the channel service processor. The channel service processor retrieves 162 status data from the control word processor 163 and the status data becomes part of the terminate status command. The terminate status command is transferred 164 via control subsystem access controller to the central subsystem.

The central subsystem stores 165 portions of the terminate status command and issues a storage data command. The central subsystem data distributor identifies 166 the storage data command and issues release command (4). The peripheral subsystem access controller transfers 167 the release command to the peripheral subsystems. The peripheral subsystems identify 168 the release command and issues a set terminate interrupt command. The set terminate interrupt command is transferred 169 via the peripheral subsystems data controller to the channel service processor. The channel service processor obtains 170 the mailbox status address from the control word processor. The central subsystem access controller transfers 171 the set terminate interrupt to the central subsystem.

The central subsystem retrieves 172 the mailbox status word. The mailbox status word is then transferred 173 via the central subsystem data distributor to the control word processor. The control word processor examines 174 the mailbox status word and issues a restore command to the central subsystem. The central subsystem restores 176 the mailbox status word and issues a mailbox status word status command. The central subsystem data distributor identifies 177 the mailbox status word status and issues a release command (5). The release command is transferred 178 via the peripheral subsystem acess controller to the peripheral subsystem. The predetermined peripheral subsystem, in response to the release command, is now made available 179, for another operation.

OPERATION OF THE PREFERRED EMBODIMENT

The execution of the above-described operation example is implemented by the components of the input/output multiplexer acting independently. Each of the steps of the operation can be performed by the assigned component without impacting the operation of the remaining components.

In particular, in the described operation example, there is a minimum opportunity for the necessity of simultaneous operation of the input/output multiplexer components. However, in the preferred embodiment, a multiplicity of operations may be in various stages of execution with the only restriction being that, during an operation, the associated peripheral subsystem is reserved to the use of that operation.

In order to describe the operation of the input/output multiplexer, the operation described above will be summarized. The main data and control signal path from the central subsystem 3 to the peripheral subsystems 4 is through the central subsystem data distributor 21 and through the peripheral subsystems access controller 26. The main data and control signal path from the peripheral subsystems 4 to the central subsystem is through the peripheral subsystem data controller 27, the channel service processor 28, and the central subsystem access controller.

In the preferred embodiment, a control word processor 24 has been added which can receive signals from the central subsystem data distributor and can deliver signals to the channel service processor. The control word processor contains memory locations associated with each peripheral subsystem, and contains an arithmetic capability. The memory locations are utilized to store information developed in the central subsystem and normally retained and manipulated in the central subsystem. In the preferred embodiment, duplicate files are transferred to the control word processor, and address development is performed in the input/output multiplexer rather than in the central subsystem and the developed addresses are utilized to address the appropriate locations in either the central subsystem or in the peripheral subsystems. Thus the control word processor must be capable of delivering signals to the channel service processor or to the peripheral subsystems access controller. In addition, the manipulative capacity of the control word processor can be utilized to provide commands directly to the central subsystem via the central subsystem access controller, rather than through the channel service processor.

The read register and fault interrupt processor 23 receives signals from the central subsystem data distributor and delivers signals to the central subsystem access controller or to the peripheral subsystems access controller. The register and fault processor 23 provide certain maintenance and decision making capability that is not utilized in normal operation executions, i.e., for the data transfer type operations described previously.

The channel service processor has certain decision making capabilities such as determining when signal groups should be retrieved from the control word processor. In addition, for large blocks of data transfer, the channel service processor determines when the correct amount of data has been transferred.

As will be clear, with a multiplicity of operations in concurrent execution, the possibility of overlapping demands on the central subsystem access controller and on the peripheral subsystem access controller is present. Thus, switch 25 and switch 29 have been added to the input/output multiplexer to ensure that the integrity of signal groups is maintained and, demands on the switch component are prioritized to resolve conflicting requirements.

The above description is included to illustrate the operation of the preferred embodiment and is not meant to limit the scope of the invention. The scope of the invention is to be limited only by the following claims. From the above discussions, many variations will be apparent to one skilled in the art that would yet be encompassed by the spirit and scope of the invention.

What is claimed is:

1. In a data processing system including at least one central subsystem and a plurality of peripheral subsystems wherein data signal groups are transferred between a central subsystem and a selected peripheral subsystem as a result of an exchange of a plurality of signal groups between said central subsystem and said selected peripheral subsystem, said signal groups including control signal groups and said data signal groups, an input/output apparatus, coupling said central subsystem and said peripheral subsystem, comprising:
   (a) first input means for receiving signal groups from said central subsystem to distribute said signal groups within said input/output apparatus;
   (b) first output means, coupled to said first input means, for transmitting signal groups to said selected peripheral subsystem;
   (c) second input means for receiving signal groups from said peripheral subsystem;
   (d) second output means for transferring signal groups to said central subsystem; and
   (e) processor means, coupled to said first and second input means and said second output means, for storing file signal groups from said central subsystem in response to a first preselected signal group from said peripheral subsystem, said processor means producing address signal groups from said file signal groups, said processor means delivering said address signal groups to said second input means in response to second preselected signal groups, said address signal group determining a location in said central subsystem of said data signal group involved in said transfer, said processor means providing that said first input and said first output means operate independently of said second input and said second output means.

2. In a data processing system, an input/output (I/O) multiplexer, operatively connected to a central subsystem and at least one peripheral subsystem, thereby coupling signal groups between said central subsystem and a selected peripheral subsystem, for exchanging data signal groups between the central subsystem and the selected peripheral subsystem as a result of an exchange of control signal groups, said I/O multiplexer comprising:
   (a) first means for receiving data signal groups and control signal groups from said central subsystem for said selected peripheral subsystem, to control distribution of said data signal groups and said control signal groups within said I/O multiplexer;
   (b) second means for receiving data signal groups and control signal groups from said first means to perform address preparation on selected control signal groups and to store control signal groups, wherein said stored signal groups include file signal groups from said central subsystem, said address preparation providing an address signal group;
   (c) third means for receiving signal groups, said signal groups including control signal groups and data signal groups, from said first means to deliver signal groups to said selected peripheral subsystems; and
   (d) fourth means for transferring signal groups from said selected peripheral subsystem to said central subsystem, said fourth means operatively connected to said second means, whereby said second means provides said address signal groups determining a central subsystem location for said transferred signal groups, wherein each transfer of said signal groups from said preselected peripheral subsystem and each transfer of signal groups to said selected peripheral subsystem are performed in a predetermined sequence, but independently of prior signal group transfers.

3. In a data processing system, having input/output (I/O) multiplexer operatively connected to a central subsystem and at least one peripheral subsystem, a method of exchanging data signal groups between the central subsystem and the selected peripheral subsystem as a result of an exchange of control signal groups, the I/O multiplexer controlling the exchange of said data signal groups, said method controlled by the I/O multiplexer comprising the steps of:
   (a) upon receipt of a connect command from the central subsystem, storing a first portion of the connect command, said first portion containing an address location within said central subsystem of file signal groups;
   (b) transferring a second portion of the connect command to the peripheral subsystem;
   (c) upon receipt of a first fetch command from the selected peripheral subsystem, transferring the first fetch command to said central subsystem, said first fetch command including the first portion of the connect command identifying the address location of the file signal groups;
   (d) upon receipt of the file signal groups, developing the real address locations of the file signal groups within the central subsystem;
   (e) issuing a predetermined control signal group to said selected peripheral subsystem;
   (f) upon receipt of a command control signal group from said peripheral subsystem, transferring the command control signal group to said control subsystem, the command control signal group including the real address locations of the file signal group developed in step (d);
   (g) repeating steps (d)–(f), until the real address location of the data signal group is developed; and
   (h) transferring the received data, maintaining a tally of the data transferred such that the data is transferred in accordance with information specified in the file signal group.

4. In a data processing system, a method of exchanging data signal groups according to claim 3, wherein step (d) through step (g) comprise the steps of:
   (a) upon receipt of mailbox signals from the central subsystem, storing said mailbox signals;
   (b) developing the real address location of an instruction data control word signal;
   (c) issuing a first release command control signal to said selected peripheral subsystem;
   (d) upon receipt of a move pointer command control signal, issuing the move pointer command control signal to the central subsystem, the move pointer command control signal having appended thereto the real address location of the instruction data control word signal developed in step (b);
   (e) upon receipt of the instruction data control word signal from the central subsystem, developing the real address of the data control word signal;
   (f) issuing a second release command control signal to said selected peripheral subsystem;
   (g) upon receipt of a list service command control signal from the selected peripheral subsystem, issuing the list service command control signal to the central subsystem, the list service command control signal having appended thereto the real address of the data control word signal developed in step (e);
   (h) upon receipt of the data control word signal from the central subsystem, developing the real address of the data involved in the transfer; and
   (i) issuing a third release command control signal to said selected peripheral subsystem.

* * * * *